United States Patent [19]

Bohm et al.

[11] Patent Number: 4,693,761
[45] Date of Patent: Sep. 15, 1987

[54] PROCESS AND DEVICE FOR HANDLING WORKPIECES, ESPECIALLY FOR THE THERMAL SEPARATION OF PROFILES WITH A CUTTING TORCH

[75] Inventors: August Bohm, Kelkheim; Gerhard Lentz, Niedernhausen; Gunter Wilkens, Kelkheim, all of Fed. Rep. of Germany

[73] Assignee: Oxytechnik, Fed. Rep. of Germany

[21] Appl. No.: 839,223

[22] Filed: Mar. 13, 1986

[30] Foreign Application Priority Data

Mar. 22, 1985 [DE] Fed. Rep. of Germany ....... 3510381

[51] Int. Cl.$^4$ ............................................. B23K 7/10
[52] U.S. Cl. .................................... 148/9 R; 266/58; 266/60; 266/62
[58] Field of Search .................. 266/58, 60, 62; 148/9

[56] References Cited

U.S. PATENT DOCUMENTS 3,842,330 10/1974 Kolell .................................... 266/58
4,449,699  5/1984 Ashizawa et al. ..................... 266/58
4,450,014  5/1984 Hayasaki et al. ..................... 266/58

Primary Examiner—Wayland Stallard
Attorney, Agent, or Firm—Harold Pezzner

[57] ABSTRACT

A process for the thermal cutting of profiles with a cutting torch which is guided by a control unit in accordance with the workpiece contour includes storing the contour in the control unit. The absolute values of the profile are determined by means of measuring devices in the vicinity of the profile. These values are transmitted to the control unit for determining the actual workpiece contour and the control signals for the torch.

15 Claims, 3 Drawing Figures

PROCESS AND DEVICE FOR HANDLING WORKPIECES, ESPECIALLY FOR THE THERMAL SEPARATION OF PROFILES WITH A CUTTING TORCH

BACKGROUND OF THE INVENTION

During the thermal cutting of profiles such as U-, I-, Double T-, T-, Angle- and bulb angle profiles, the cutting tool must be started at the edge of the profile and then guided according to the outline of the profile.

From DE-OS No. 26 41 851, it is known that two capacitative sensors can be associated with a cutting torch. The signals from the sensors which correspond to the contour of the workpiece are transmitted, as regulating signals, to a torch adjustment motor for the purpose of maintaining an even cutting position.

SUMMARY OF THE INVENTION

The object of the invention is to reduce the influence of the preparation period and of idle periods, particularly the positioning of the torches and therewith, to increase the speed of a welding or cutting procedure, especially a profile cutting procedure or to reduce the duration of the cycle.

With the inventive process, which is used for cutting or welding workpiece contours, the profile is positioned in a device and the torch is preferably programmed to be at the null point at the start of the cut in order to automatically position the welding or cutting torch, in the simplest way, without special sensors or measuring devices to a standard start of cut point. It is possible, of course, to program the torch to start at a desired point of the workpiece if process conditions require it, as for example, the welding or cutting direction, the welding positions, or device dependent components. The location of this null point is preferably the same for all contours in the device.

The advantages obtained with the invention consist especially in the rapid assessment of the actual workpiece contour during the longitudinal positioning of the profile in the positioning device. As a result of the determination of the actual contour of the profile in the positioning device, that is, independent of the welding or cutting apparatus, trouble prone sensors in the vicinity of the torch can be advantageously omitted and the workpiece can be cut or welded according to its tolerances. Furthermore, as a result of the firmly adjusted cutting start point, the torch can be shifted from a certain parking position to the cutting start point while, at the same time, the profile is positioned in a longitudinal direction and the actual contour of the profile is determined. As a result of the simultaneous occurrence of these positioning processes, a great time saving is achieved in actual practice. Edge seeking cycles can be omitted.

As a result of the flexible manufacturing system, the manufacture of a single part is possible. Combining to lot quantities of identical or mirror image parts is unnecessary. An intermediate support can be omitted. The production of all cut shapes including seam preparation as well as labeling and marking are possible with the apparatus.

As a result of storing only one workpiece contour or basic cut shape per profile type (variable macro), a simple programming is achieved since the actual dimensions of identical profile shapes are determined by the measuring system of the positioning device and serve to to guide the torch.

As a result of the firmly established null point of the positioning device, the cutting zone is always at one location. As a result of this, scrap pieces can be automatically guided away by means of scrap buckets and a suction device can easily be mounted.

By using a computer in which the variables for the programmed cut shape are determined by means of the measured numerical values of the profile contour, a data interface with mainframe computers or CAD systems is possible. Automatic nesting of the given profile parts, and therewith the least possible waste, is advantageously feasible.

THE DRAWINGS

DETAILED DESCRIPTION

Figure 1:
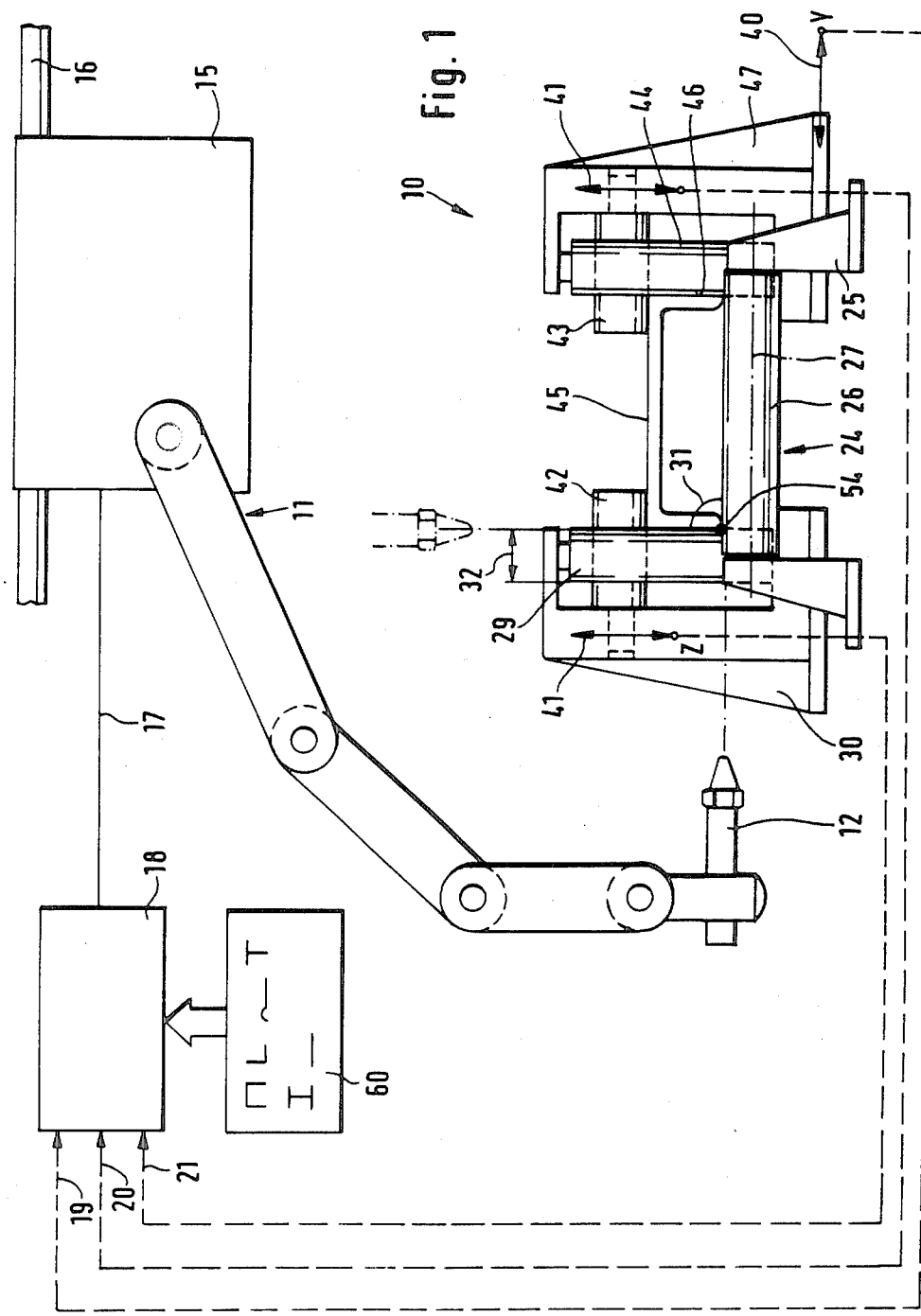
FIG. 1 is a schematic diagram of the apparatus for executing the invention.
Figure 2:
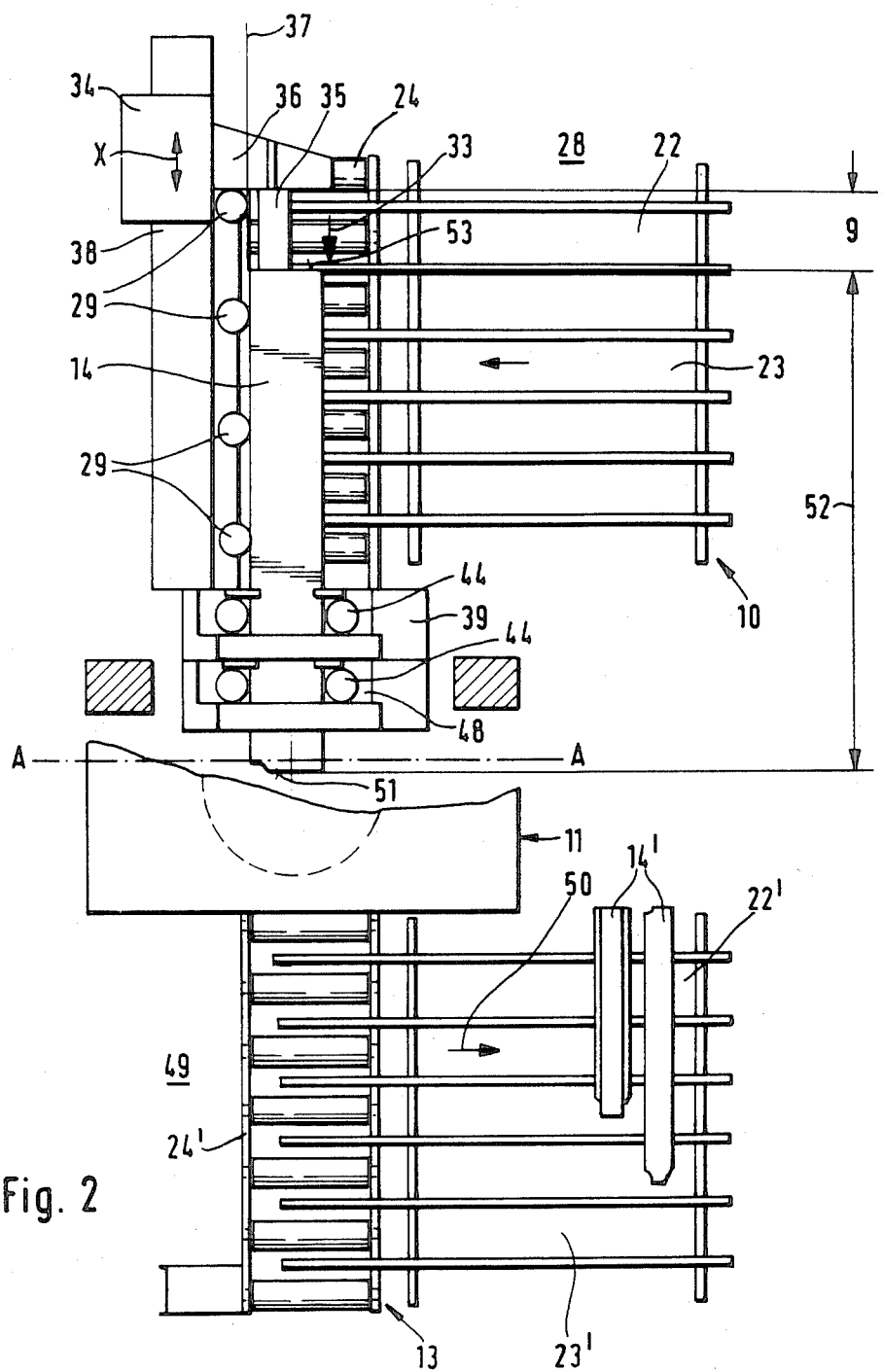
FIG. 2 is a schematic top view of the profile cutting apparatus.

A device for executing the process is, in its entirety, labeled 10 in FIGS. 1 and 2. The process is described by means of a profile cutting device which essentially consists of a robot 11, preferably a jointed arm robot, onto which a cutting torch 12 is attached, and of an apparatus 13 for feeding and positioning the profiles 14. The robot is designed as a rail bound overhead trolley 15. In addition to this, the robot 11 has an electromotorized linear drive (not illustrated) the motion of which is transferred by means of a spindle/spindle nut. The robot 11 is linearly guided by the rails 16 mounted above the apparatus 13. The robot 11 is connected, via cable 17 to a computer 18 which is connected to a distance measuring apparatus (not illustrated) by means of cables 19, 20, 21.

The robot can, of course, also be designed for cartesian coordinates and/or be mounted in a stationary manner.

The apparatus 13 consists of a buffer table 22 which is connected, via an integrated transverse conveyor 23, preferably a chain conveyor, to roller track 24. The roller track 24 consists, fundamentally, of carrier rollers 26, with solid axes 27 as the support elements, set in a longitudinal foundation 25. The distance between the carrier rollers 26 is such that the profile rests on at least two carrier rollers.

At the above described profile feed side 28 of the roller track 24, rigid stop rollers 29 border the longitudinal side of the roller track 24 opposite that of the transferse conveyor 23. The stop rollers 29 are, preferably, mounted in supporting traverses 30 which are installed in a stationary manner. The stationary stop rollers 29 and the carrier rollers 26 of the roller track 24 form a right angle 31. Furthermore, the stop rollers 29 with their diameter 32 reach into the longitudinal conveyor 33 formed by the carrier rollers 26.

At the profile feed side 28, a measuring cart 34 is installed which is mounted on the side of the roller track 24 opposite that of the transverse conveyor 23. The measuring cart 34, which is not illustrated in greater detail, has its own drive with which it can be moved linearly in the direction of the longitudinal conveyor 33, heretofore referred to as direction X. A feed stop 35, which reaches into the longitudinal conveyor 33, is attached to the measuring cart by means of a bracket 36."

The length 9 of the feed stop 35 is so designed that even small profile cuts or profile remnants can be slid into a positioning device 39 which is yet to be described. The length 9 corresponds approximately to the distance between the two measuring-and-tension rollers 44 (FIG. 2). The measuring cart preferable travels on a guide 38 along a path parallel to the X tangent 37 to stop rollers 29.

Other measuring and conveying systems can, of course, be installed in the direction X. It is, for example, possible to feed the profile 14 with a tow roller or with a roller track with power driven rollers as well as to determine the longitudinal dimensions.

At the profile feed side 28, connected to the roller track 24 is a positioning device 39 in which the profile 14 is held tightly against the carier rollers 26 and the stop roller 29 which act as determining elements. The adjustable tension rollers 42, 43, 44 preferably serve as horizontal (arrow direction 40) and vertical (arrow direction 41) tension elements. in FIG. 1, the tension rollers 42 and 43 are moved in the Z-direction 41 until their range is upon the surface 45 of the profile and thereby hold the profile 14 tightly against the carrier rollers 26. The movable tension roller 44 is moved in the Y direction until it is against the surface 46 of the profile 14 and thereby holds the profile 14 tightly against the stop rollers 29.

The tension rollers 42, 43, 44 are mounted, as illustrated in FIG. 1, in bearing pedestals 47 whereby the tension rollers 42, 43 which are movable in the Z direction 41 are movable in this bearing pedestal 47. The tension roller 44, on the other hand, is moved by moving the bearing pedestal 47 in the Y direction 40.

It is, of course, also possible to position the tension rollers 42 and 43 by means of horizontally and vertically adjustable bearing pedestals. In an additional development, the tension rollers 42, 43, 44 are tightened against the surfaces 45, 46 by means of hydraulic cylinders. As especially evident from FIG. 2, several measuring and tension rollers can, of course, be mounted one behind the other.

As previously mentioned, the tension rollers are connected to the computer 18 by means of a not illustrated distance/path measuring system via the control cables 19, 20, 21. For the distance measuring system, one can hereby use magnetic systems such as, for example, "inductosyn" or impulse scales. Angle indicators are preferably installed, however, for the absolute measurement of the linear movements of the tension rollers 42, 43, 44 or of the bearing pedestal.

Behind the positioning devie 39 with the integrated measuring device 48, in the direction of the longitudinal feed path 33, lies the preset reference line A—A from which the cut is made. The line A—A is in the operating range of the robot 11 which, as previously described, is mounted above the apparatus 13, specificially above the positioning device 39. Behind the line A—A is the profile discharge side 49 which consists of a roller track 24 with, powered rollers, which likewise is in operational contact with a buffer table 22' via a transverse conveyor 23' which is not illustrated in greater detail. The cut profiles 14' are transported via the roller track 24' and the transverse conveyor 23' to the buffer table 22'. The transverse conveyer 23' then lifts in the fore region of the roller track 24' and conveys the profile 14', via chains (not illustrated) to the buffer tables 22' (arrow direction 50).

The device 10 described above operates as follows. The profiles to be cut, which as a rule are between 10 and 15 m long, are deposited onto the integrated buffer tables 22 and transverse conveyor 23 with a cart or crane (not illustrated). Then, the profile to be cut 14, which is represented as a U profile in FIG. 1, is conveyed by means of the chain system of the tranvsverse conveyor 23 onto the roller track 24. The U profile 14 hereby lies with its open side on the carrier rollers 26 of the roller track. The chains of the transverse conveyor 23 operate, in the case of this feed process, until the profile 14 is firmly against the vertical stop rollers 29. The transverse conveyor 23 then sinks in the front region and deposits the profile 14 onto the carrier rollers 26 of the roller track 24. The length of the profile 14 is thereby determined by the carrier rollers 26 and the stop rollers 29.

If the profile 14 to be cut is a symmetrical profile such as a flat, U-, Double T-, or bulb profile, the measuring cart 34 immediately slides the profile 14 by its beginning 51 in the X direction 33 over the line A—A into the first cutting position.

The absolute profile length 52 is preset in the drive of the measuring cart 34 in order to position the profile 14 in the first cutting position. This is advantageously possible because the profiles 14 used have, for example, a length of 10.5 m and profile sections with an actual length of 2 m are cut from one profile.

As a result of the preset value of, for exmaple, 10 m, the measuring cart 34 moves the profile from a firmly preset parking position so that the profile length between the reference line A—A and the end 53 of the profile amounts to 10 m.

When the beginning 51 of the profile passes the positioning and measuring device 39, 48, the first measuring and tension roller 44 travels in the Y direction under tension. Then, the measuring and tension rollers 42 on the rigid contact side and the measuring and tension rollers 43 on the movable side simultaneously travel in the Z direction under tension.

The roller 43 is, preferably, designed only as a tension roller.

As already mentioned above, a motion sensor is associated with each roller 42, 43, 44 and/or bearing pedestal 47 for the absolute measurement of the linear motion. The motion sensors are set at a definite distance from the null point 54 of the machine (FIG. 1) so that the measuring and tension rollers 42, 43, 44 and/or the bearing pedestals 47 always proceed from a definite preset null reference point.

In FIG. 1, the cutting torch 12, attached to the robot 11, is shown, schematically, to be in cutting position at the null point 54 of the machine. The cutting torch 12 is hereby represented, for reasons of viewability, at a greater distance from the null point.

It is, of course, also possible to program the cutting torch 12 to a desired cut start point on the workpiece's contour.

The measurement values thus obtained are transmitted to the computer 18 which determines the variables of the preprogrammed cutting shape or contour—represented in FIG. 1 by the symbols 60—by means of the numerical measurement values and then, these measurement value are further transmitted to the robot 11. The robot then follows the exat geometric shape of the part ot be cut after the measuring process.

After the tension-measurement process, the robot executes the cut which it was programmed for in the region of the line A—A. The cutting torch 12 is hereby guided according to the measured workpiece contour and the cut image stored in the computer 18 as a macro or subprogram.

The term "cut image" can be understood as the cutting operations, occurring in the manufacturing program, which deviate from a linear separation cut, for example, seam preparation cuts, bevel cuts, cutouts, circular cuts, etc.

Following this, the positioning of the profile 14 by means of the measuring cart 34 in the X direction occurs. Thus, according to the above example, the profile 14 is moved two meters farther.

The measuring and tension rollers 42, 43, 44 need not be moved back during this longitudinal positioning; thus, after the longitudinal drive stops, the computer 18 immediately uses the actual workpiece contour or cutting shape of the profile 14 again for the next cut.

A rapid and exact positioning of the the cutting torch even with large workpiece tolerances is advantageously made possible by the actual measurement of the workpiece contour. A positioning precision of less than ±0.5 mm is achieved which, especially with an autogenic cutting torch and the head process required for it, leads to a flawless and clean cut.

After the second cut, the cut profile 14' is brought, via the roller track 24', to the transverse conveyor 23' at the discharge side. From the latter, the finished profiles are fed to the buffer table 22' as previously described.

Figure 3:
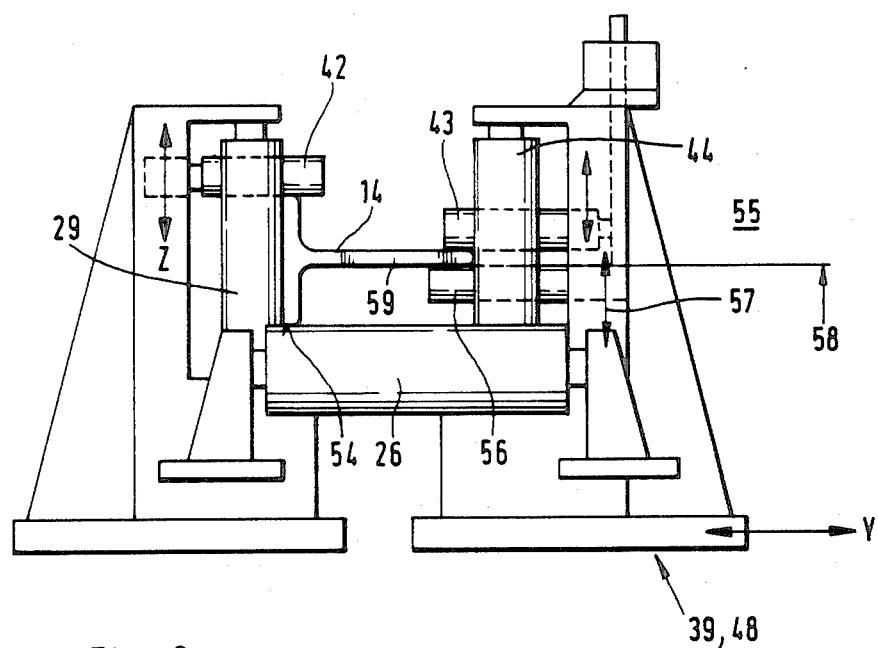
FIG. 3 is a side view of the measuring and tension station of FIG. 2 with a T-profile.

FIG. 3 shows, schematically, a sectional view of the positioning-and-measuring device 39, 48 in which, as an example, an asymmetrical profile 14 is gripped and measured. The same reference numbers are used in the drawing for similar components. The profile cutting process occurs as already described above. Unlike the above described embodiment of the positioning-and-measuring device 39, 48 for symmetrical profiles, an additional support roller 56 first travels on the loose side 55 in the Z direction 57 up to a preset measure while processing angle and T profiles. The free profile wing 59 is guided in a horizontal position by a the support roller 56.

The support rollers are preferably mounted between the carrier rollers 26 of the roller track 24 so that the profile wing 59 is supported in a horizontal position over the entire length 52 of the profile. The support rollers 56 are, preferably, mounted in a retractable fashion, between the carrier rollers 26 of the roller track 24 so that the symmetrical profiles illustrated in FIG. 1, such as, for example, the U profile, can also be processed on the same roller track 24.

In the above described embodiment, the workpiece profiles 14 are U, 1, double T, T, angle or bulb profiles.

If the process and the device according to the invention are used for welding, the workieces can, of course, be built from suitably shaped individual parts which can be held and gripped by a positioning device. Sensors are associated with the movable tension elements that determine, tolerance free, the actual dimensions of the workpiece shaped individual parts and transmit the dimensions to the welding torch control unit.

The workpiece can then be welded according to the stored welding image. The term "welding image" means all the movements of the torch which occur in the manufacturing program and which are not determined by the measuring system of the device, as, for example, the swaying of the torch.

Advantageously, beside the dimensions of the workpiece, changes in the workpiece during welding such as faults or contractions can be determined and transmitted to the control unit for correction of the welding path.

Additionally, according to the invention, an automatic feed and positioning of tubular/pipe profiles as well as an automatic discharge of the finished parts is achieved.

SUMMARY

The invention is concerned with a process for handling workpieces, especially for the thermal separation of profiles 14 with a cutting torch 12 which is guided by a control unit 18 according to the contour of the workpiece.

In order to reduce the influence of preparation and idle periods, especially torch positioning periods, and thus to increase the speed of a welding or cutting process, the workpiece contour 45, 46 is stored in the control unit 18 and, additionally, the absolute values of the profile 14 to be processed are determined by means of measuring devices and the measured values of the workpiece to be processed are transmitted to the control unit 18 for the determination of the actual workpiece contour and for the determination of the control signals for the torch 12 (FIG. 1).

What is claimed is:

1. In a process for handling workpieces, such as for the thermal cutting of profiles with a cutting torch which is guided according to the contour of a workpiece by a control unit, the improvement being in storing the workpiece contour variably in the control unit, determining the absolute values of the profile to be processed by means of measuring devices in the vicinity of the profile, and transmitting the absolute values to the the control unit for determing the actual workpiece contour and for determining the control signals for the torch.

2. Process according to claim 1, characterized therein that the cutting images are which occur in the manufacturing program are stored in the control unit.

3. Process according to claim 1, characterized therein that the welding images are which occur in the manufacturing program are stored in the control unit.

4. Process according to claim 1, characterized therein that the profile is positioned in a device, and that the torch is programmed to start cutting at a point of the workpiece contour, corresponding to the null point of the device.

5. Process according to claim 4, characterized therein that the profile is positioned in a device, and that the torch is programmed to start cutting at a point of the workpiece contour, corresponding to the null point of the device.

6. In a device for the thermal handling of profiles with a thermal operating tool which is guided by a control unit to the contour of a workpiece, the improvement being said thermal operating tool having a guiding unit with said tool being attached thereto, a positioning unit for receiving the profile, and said positioning unit having a measuring unit connected with said control unit for storing the workpiece contour variably in said control unit.

7. Device according to claim 6 wherein said tool is a cutting torch, and said guiding unit being a robot.

8. Device according to claim 7, characterized therein that said positioning unit consists of a roller track with stop rollers, and carrier roller mounted at a right angle to said stop rollers.

9. Device according to claim 8 characterized therein that movable tension rollers which clamp the profile against at lest one of said stop rollers and said carrier rollers are provided in said positioning unit.

10. Device according to claim 9, characterized therein that said tension rollers are connected with motion sensors the null-reference point of which corresponds to the null point.

11. Device according to one the claims 9, characterized by said roller track and said rigidily mounted stop rollers and said ositioning unit havine an integrated measuring device in which said tension rollers are movable in the Y and Z directions are provided which are associated with a motion sensor which is connected, via a control cable to a computer which controls said torch by means of said robot.

12. Device according to claim 11, characterized therein that a measuring cart is provided at said roller track for moving the profile on said roller track in the X direction.

13. Device according to claim 12, characterized therein that at least one support roller is installed on the loose side so as to be movable in the Z direction for cutting an asymmetrical profile.

14. Device according to claim 12, characterized therein that a measuring cart is provided at said roller track for moving the profile on said roller track in the X direction.

15. Device according to claim 13, characterized therein that at least one support roller is installed on the loose side so as to be movable in the Z direction for cutting an asymmetrical profile.

* * * * *